(12) United States Patent
Moulton, III (10) Patent No.: US 6,626,131 B2
(45) Date of Patent: Sep. 30, 2003

(54) HANDS-FREE LEASH SYSTEM

(75) Inventor: Reynolds E. Moulton, III, Jamaica Plain, MA (US)

(73) Assignee: Dogmatic Pet Products, Inc., Brooklyn, NY (US)

( * ) Notice: Subject to any disclaimer, the term of this patent is extended or adjusted under 35 U.S.C. 154(b) by 0 days.

(21) Appl. No.: 10/061,113

(22) Filed: Feb. 1, 2002

(65) Prior Publication Data
US 2002/0195065 A1 Dec. 26, 2002

Related U.S. Application Data
(60) Provisional application No. 60/299,738, filed on Jun. 22, 2001.

(51) Int. Cl.[7] .......................... A62B 35/00; B60R 22/00; E06C 7/18
(52) U.S. Cl. ............................................. 119/770; 182/3
(58) Field of Search ................................ 119/770, 772, 119/774, 792; 182/3

(56) References Cited

U.S. PATENT DOCUMENTS

| | | | |
|---|---|---|---|
| 4,384,548 A | * 5/1983 | Cohn | 119/792 |
| 5,289,896 A | * 3/1994 | Giglio | 182/3 |
| 5,325,818 A | * 7/1994 | Leach | 119/770 |
| 5,485,811 A | 1/1996 | Jacobsen et al. | 119/798 |
| 5,509,859 A | 4/1996 | Klees et al. | 472/64 |
| 5,511,293 A | 4/1996 | Hubbard, Jr. et al. | 24/442 |
| 5,517,949 A | 5/1996 | Harris et al. | 119/795 |
| 5,531,622 A | 7/1996 | Nealy | 441/75 |
| 5,540,188 A | * 7/1996 | Heinrichs | 119/770 |
| 5,558,044 A | 9/1996 | Nasser, Jr. et al. | 119/796 |
| D375,587 S | 11/1996 | Maglich | D30/153 |
| D376,215 S | 12/1996 | Gomm et al. | D26/38 |
| D377,146 S | 1/1997 | Schmidiger | D9/499 |
| 5,595,143 A | 1/1997 | Alberti | 119/794 |
| 5,611,298 A | 3/1997 | Sporn | 119/792 |
| D378,987 S | 4/1997 | Ross | D8/356 |
| 5,632,234 A | 5/1997 | Parker | 119/795 |
| D379,689 S | 6/1997 | Levine et al. | D30/153 |
| 5,643,028 A | 7/1997 | Craig | 441/75 |
| 5,649,504 A | 7/1997 | Culp | 119/795 |
| D382,379 S | 8/1997 | Smith | D30/153 |
| 5,664,844 A | * 9/1997 | Greene | 119/770 |
| 5,676,093 A | 10/1997 | Sporn | 119/792 |
| 5,680,832 A | 10/1997 | McCrosson | 119/797 |
| 5,682,840 A | 11/1997 | McFarland | 119/856 |
| 5,685,751 A | 11/1997 | Feyas | 441/75 |
| D388,558 S | 12/1997 | Miller | D30/153 |
| 5,697,329 A | * 12/1997 | Bell et al. | 182/3 |
| 5,699,555 A | 12/1997 | Schunter | 2/1 |
| 5,701,848 A | 12/1997 | Tozawa | 119/797 |
| D389,612 S | 1/1998 | Jacobsen | D30/153 |

(List continued on next page.)

FOREIGN PATENT DOCUMENTS

| WO | WO 96/03861 A2 | 7/1995 |
|---|---|---|
| WO | WO 97/25858 A1 | 1/1997 |
| WO | WO 97/25859 A1 | 7/1997 |
| WO | WO 00/07436 A1 | 7/1999 |

*Primary Examiner*—Charles T. Jordan
*Assistant Examiner*—Elizabeth Shaw
(74) *Attorney, Agent, or Firm*—Lahive & Cockfield, LLP; David J. Rikkers (57) ABSTRACT

The present invention provides an apparatus for coupling a human operator to a subject. In particular, the operator is provided with a leash adapted to be secured about their torso, such as by a belt and a strap to extend over a shoulder. Coupling to the subject may be performed in a variety of ways, such as by an extension leash coupled to a collar on the subject. If the subject is a human, a leash may also be worn by the subject. Further embodiments of the invention provide for manual control of the extension leash by a loop and optional automatic disconnection of the extension leash from the leash worn by the operator upon application of large tensile forces applied to the extension leash.

34 Claims, 8 Drawing Sheets

U.S. PATENT DOCUMENTS

| | | | |
|---|---|---|---|
| D389,613 S | 1/1998 | Jacobsen | D30/153 |
| D389,614 S | 1/1998 | Jacobsen | D30/153 |
| D389,615 S | 1/1998 | Leslie | D30/153 |
| 5,709,172 A | 1/1998 | Maglich | 119/797 |
| D390,096 S | 2/1998 | Thompson | D8/367 |
| 5,718,189 A | 2/1998 | Blake | 119/770 |
| 5,718,192 A | 2/1998 | Sebastian | 119/795 |
| D392,429 S | 3/1998 | Plewa et al. | D30/153 |
| 5,724,921 A | 3/1998 | Bell | 119/795 |
| 5,732,660 A | 3/1998 | David et al. | 119/792 |
| 5,732,661 A | 3/1998 | Lagro | 119/795 |
| 5,732,662 A | 3/1998 | Jacobsen | 119/798 |
| 5,732,663 A | 3/1998 | Manzella | 119/798 |
| D393,504 S | 4/1998 | Eisman | D30/162 |
| 5,738,556 A | 4/1998 | Palmieri | 441/75 |
| 5,740,764 A | 4/1998 | Jacobsen | 119/798 |
| 5,762,029 A | 6/1998 | DuBois et al. | 119/796 |
| 5,775,965 A | 7/1998 | Hango | 441/75 |
| 5,775,970 A | 7/1998 | Klees et al. | 446/297 |
| 5,779,510 A | 7/1998 | Skedelsk | 441/75 |
| 5,791,295 A | 8/1998 | Schmid et al. | 119/793 |
| 5,795,205 A | 8/1998 | Gantenbein et al. | 441/75 |
| D398,085 S | 9/1998 | Gallo | D30/154 |
| 5,803,017 A | 9/1998 | Stewart | 119/799 |
| 5,806,467 A | 9/1998 | Arakawa | 119/771 |
| 5,806,468 A | 9/1998 | Ryder | 119/776 |
| D400,317 S | 10/1998 | Koch | D30/152 |
| 5,816,198 A | 10/1998 | Peterson | 119/794 |
| 5,826,547 A | 10/1998 | Gajewska | 119/795 |
| 5,839,394 A | 11/1998 | Dickison | 119/795 |
| D402,426 S | 12/1998 | Levine et al. | D30/153 |
| 5,842,444 A | 12/1998 | Perulli | 119/770 |
| 5,842,445 A | 12/1998 | Barbour | 119/771 |
| 5,850,807 A | 12/1998 | Keeler | 119/799 |
| 5,864,927 A | 2/1999 | Liu | 24/163 R |
| 5,873,328 A | 2/1999 | Campbell | 119/798 |
| D406,412 S | 3/1999 | Rubinstein | D30/153 |
| 5,887,550 A | 3/1999 | Levine et al. | 119/796 |
| D407,866 S | 4/1999 | Perulli | D30/153 |
| D407,867 S | 4/1999 | Rubinstein | D30/153 |
| D408,103 S | 4/1999 | Snedeker | D30/153 |
| D408,598 S | 4/1999 | Martell | D30/153 |
| 5,890,456 A | 4/1999 | Tancrede | 119/794 |
| 5,890,637 A | 4/1999 | Furneaux | 224/191 |
| D410,117 S | 5/1999 | Ball et al. | D30/153 |
| 5,901,668 A | 5/1999 | Goodger, Sr. | 119/795 |
| 5,902,164 A | 5/1999 | Shoemaker | 441/75 |
| D410,330 S | 6/1999 | Klein | D3/221 |
| 5,915,336 A | 6/1999 | Watson | 119/797 |
| 5,938,137 A | 8/1999 | Poulson | 242/379.2 |
| 5,938,492 A | 8/1999 | Carlini | 441/75 |
| 5,950,569 A | 9/1999 | Perrulli | 119/770 |
| 5,950,571 A | 9/1999 | Schade | 119/859 |
| 5,951,048 A | 9/1999 | Slaughter | 280/814 |
| 5,957,741 A | 9/1999 | Evans | 441/75 |
| 5,967,095 A | 10/1999 | Greves | 119/795 |
| D416,473 S | 11/1999 | Fleming | D8/382 |
| D417,317 S | 11/1999 | Greer | D30/153 |
| D417,318 S | 11/1999 | Lyons | D30/153 |
| 5,983,836 A | 11/1999 | Chavez | 119/796 |
| 6,000,979 A | 12/1999 | Stewart | 441/75 |
| 6,003,472 A | 12/1999 | Matt et al. | 119/796 |
| D421,322 S | 2/2000 | Tracy et al. | D30/153 |
| 6,024,054 A | 2/2000 | Matt et al. | 119/796 |
| 6,035,809 A | 3/2000 | Fingerett et al. | 119/796 |
| D422,385 S | 4/2000 | Callaghan | D30/153 |
| 6,047,664 A | 4/2000 | Lyerly | 119/719 |
| 6,047,665 A * | 4/2000 | Deveaux | 119/770 |
| 6,053,128 A | 4/2000 | McCulloch | 119/792 |
| 6,053,129 A | 4/2000 | Akre | 119/795 |
| D424,761 S | 5/2000 | Mortenson | D30/152 |
| D424,762 S | 5/2000 | Nasser | D30/153 |
| D425,265 S | 5/2000 | Rubinstein | D30/153 |
| 6,073,590 A | 6/2000 | Polding | 119/795 |
| 6,076,717 A | 6/2000 | Edwards et al. | 225/6 |
| 6,079,369 A | 6/2000 | Hill et al. | 119/771 |
| 6,085,695 A | 7/2000 | Miller et al. | 119/795 |
| 6,085,696 A | 7/2000 | Fisher | 119/798 |
| 6,085,698 A | 7/2000 | Klein | 119/859 |
| 6,089,193 A | 7/2000 | Pagliericcio | 119/795 |
| 6,095,093 A | 8/2000 | Kisko et al. | 119/770 |
| 6,095,094 A | 8/2000 | Phillips | 119/792 |
| D431,885 S | 10/2000 | Gellenbeck | D30/153 |
| 6,148,773 A | 11/2000 | Bogdahn | 119/796 |
| 6,161,314 A | 12/2000 | Kamrin | 36/112 |
| D438,000 S | 2/2001 | Couchon et al. | D3/231 |
| 6,192,835 B1 | 2/2001 | Calhoun et al. | 119/792 |
| D439,302 S | 3/2001 | Plewa | D23/153 |
| 6,205,956 B1 | 3/2001 | Dickie et al. | 119/792 |
| 6,216,641 B1 | 4/2001 | Tracy et al. | 119/797 |
| D443,117 S | 5/2001 | Rubin | D30/153 |
| 6,223,694 B1 | 5/2001 | Rubin | 119/795 |
| 6,223,695 B1 | 5/2001 | Edwards et al. | 119/796 |
| 6,230,663 B1 | 5/2001 | Welch et al. | 119/722 |
| 6,237,539 B1 | 5/2001 | Sporn | 119/795 |
| 6,240,881 B1 | 6/2001 | Edwards et al. | 119/795 |
| 6,247,427 B1 | 6/2001 | DeBien | 119/776 |
| 6,247,428 B1 | 6/2001 | Mireles | 119/795 |
| 6,247,675 B1 | 6/2001 | Askin | 248/214 |
| 6,250,256 B1 | 6/2001 | Lin | 119/795 |
| 6,253,874 B1 * | 7/2001 | Casebolt et al. | 182/3 |
| 6,267,081 B1 | 7/2001 | Rich | 119/772 |
| 6,269,777 B1 | 8/2001 | Prusia et al. | 119/792 |
| 6,273,029 B1 | 8/2001 | Gish | 119/792 |
| 6,276,305 B1 | 8/2001 | Pages | 119/792 |
| 6,289,849 B1 | 9/2001 | Macedo et al. | 119/796 |
| 6,378,465 B1 * | 4/2002 | Austin | 119/770 |
| 6,421,833 B2 * | 7/2002 | Khanamirian et al. | 182/3 |

* cited by examiner

HANDS-FREE LEASH SYSTEM

REFERENCE TO RELATED APPLICATIONS

The present invention claims priority to a U.S. Provisional Patent Application, Ser. No. 60/299,738, filed Jun. 22, 2001, entitled Leash. Provisional Patent Application Ser. No. 60/299,738 is hereby incorporated by reference.

TECHNICAL FIELD

The present invention generally relates to a leash that can be used to tether an operator to a subject.

BACKGROUND

The tethering of a subject, such as a pet, to a human has typically required that the human operator hold on to a rope or strap in order to maintain control of the pet. For example, dog leashes are typically a rope having a hook on one end for attachment to a dog collar with a loop on an opposite end to be held by a person walking the dog. Such a dog leash is required to be held by the operator during use, and forces provided by the dog tugging and lurching are transmitted through the strap to the arm of the operator. Oftentimes, this results in a yanking of the operator's arm, with uneven forces applied to a torso of the operator, potentially causing a loss of balance or overexertion of muscles in order to prevent the dog from getting away.

Such tugging or lurching may occur at any time while using a typical leash. Therefore, particularly with larger subjects such as large dogs, a user must remain vigilant and maintain a strong grip on the leash. This can often result in muscle fatigue and prevent a relaxing experience while walking a pet.

SUMMARY

The present invention is adapted to be mounted to the torso of a human operator, thereby allowing for hands-free operation and distribution of forces from a subject to the torso of the operator.

The present invention provides an apparatus for coupling a human operator to a subject. In particular, the operator is provided with a leash adapted to be secured about their torso. Coupling to the subject may be performed in a variety of ways, such as by an extension leash coupled to a collar on the subject. If the subject is a human, a leash may also be worn by the subject. Further embodiments of the invention provide for manual control of the extension leash by a loop and optional automatic disconnection of the extension leash from the leash worn by the operator upon application of large tensile forces applied to the extension leash.

According to one embodiment, a leash for coupling an operator to a subject is provided having a belt adapted to extend about a torso of the operator and a first strap, coupled to the belt at two locations and adapted to extend over a shoulder of the operator. An attachment device is also provided, mounted to the first strap and adapted to couple to the subject.

According to another embodiment, a leash for coupling an operator to a subject is provided having a belt sized to mount about a torso of the operator, a lower strap coupled to the belt near a front of the torso and an attachment device secured to the lower strap. A first upper strap, coupled to the attachment device and adapted to extend over a shoulder of the operator and coupled to the belt is also provided along with a second upper strap coupled to the attachment device and adapted to extend over a shoulder of the operator and coupled to the belt.

According to another embodiment, a leash for coupling an operator to a subject is provided having a belt adapted to extend about a torso of the operator. A first and second strap are coupled to the belt at two locations and adapted to extend over a shoulders of the operator. A third strap extends between the first strap and the second strap along a front of the operator's torso. An attachment device is mounted to the third strap.

BRIEF DESCRIPTION OF THE DRAWINGS

The invention will be apparent from the description herein and the accompanying drawings, in which like reference characters refer to the same parts throughout the different views. The drawings are not to scale.

DETAILED DESCRIPTION

The present invention can enable hands-free coupling of an operator to a subject, while enabling comfortable control of the subject by the operator. It is within the scope of the invention for the subject to be a pet or other animal, such as a dog, or a human, such a child.

Figure 1A:
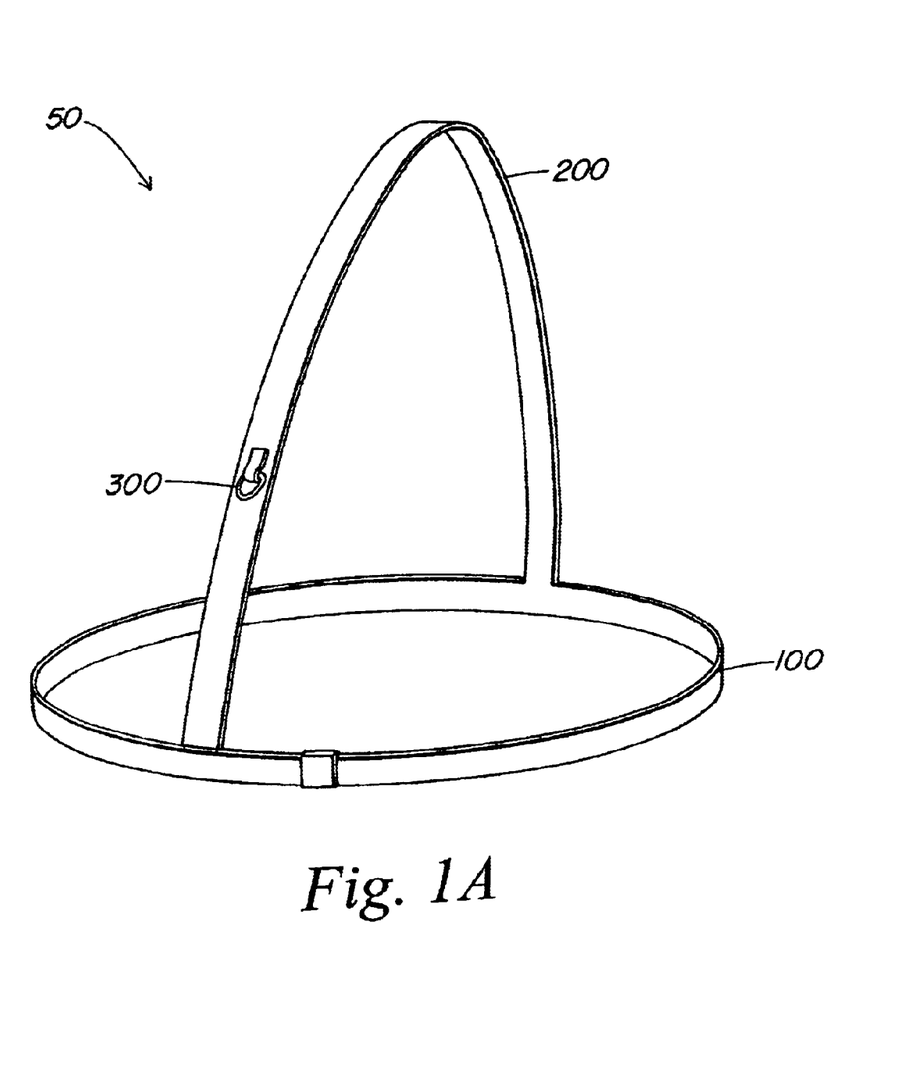
FIG. 1A illustrates a leash according to an embodiment of the invention.
Figure 1B:
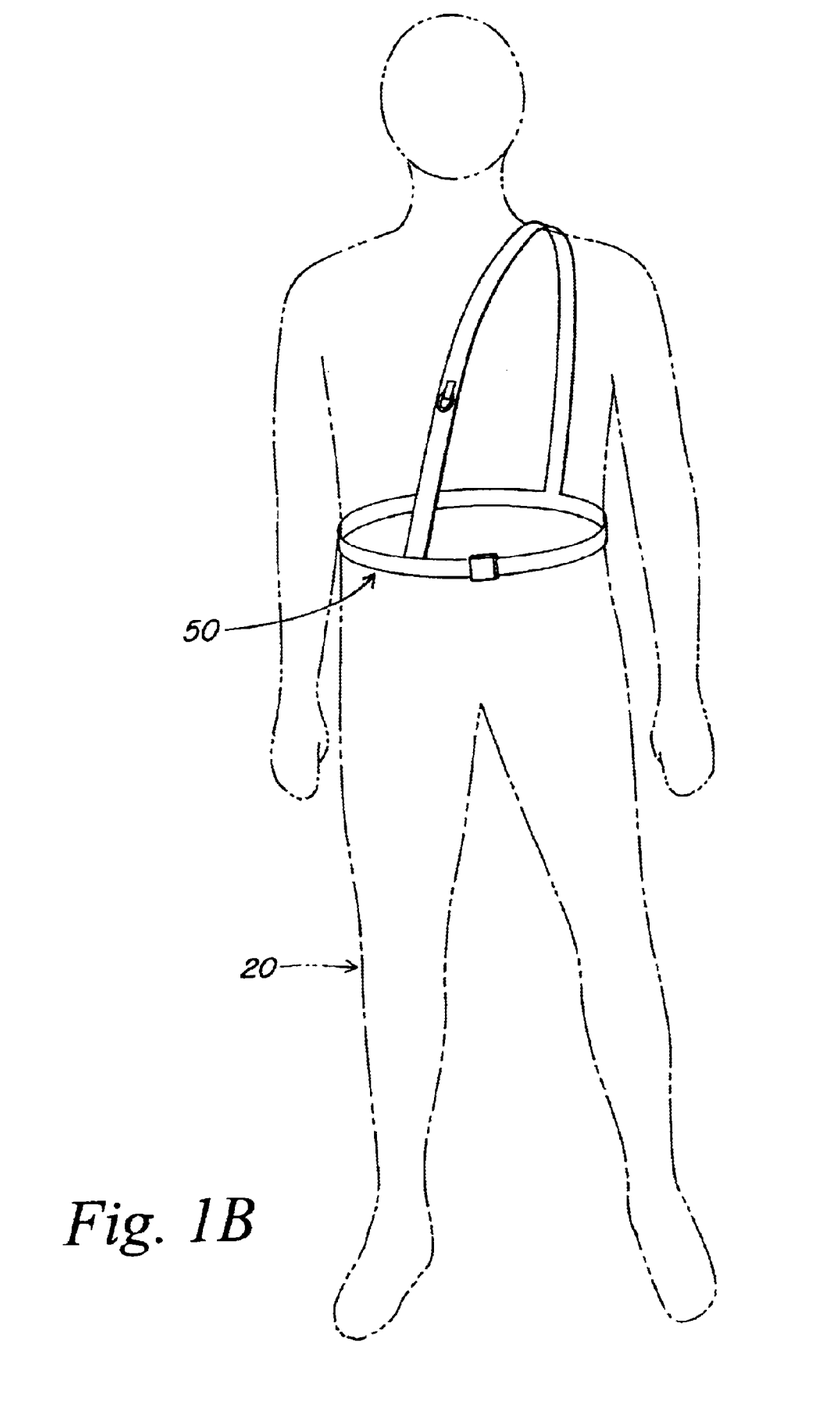
FIG. 1B illustrates the leash of FIG. 1A mounted to a human.

The first embodiment of the invention is illustrated in FIGS. 1A and 1B. A belt 100 is provided such that it may extend around the torso of a human operator 20. The belt may be formed of elastic material or other material that does not stretch. Examples of suitable belt materials include, but are not limited to, nylon webbing and elastic webbing, such as polyester webbing, or combinations thereof. The belt 100 may optionally be provided with a buckle 150 so as to facilitate locating the belt 100 about the torso of an operator 20. The buckle 150 may be any type of buckle, such as a slip, clasp or side-squeeze-type of buckle. According to an alternative embodiment, the buckle may be reflective. The belt 100 may further be provided with a mechanism to adjust the length of the belt. Such a mechanism may optionally be incorporated with the buckle 150 or may be a separate component enabling the belt 100 to be shortened or lengthened.

A strap 200 is provided to extend over a shoulder of the operator 20. The strap 200 is mounted to the belt 100 at two locations so as to facilitate the strap 200 extending over the shoulder of the operator 20. The strap may be formed of materials similar to those used in forming the belt 100. The use of a non-elastic material for the construction of the strap 200 can reduce discomfort to the operator 20 by inhibiting the strap 200 from snapping back upon the torso of the operator 20 upon release of a load upon the strap 200. In an alternative embodiment of the invention, the belt 100 and strap 200 are formed of differing colors in order to distinguish the belt 100 from the strap 200 while mounting the leash 50 to the operator 20. In a further embodiment, the strap 200 may be padded along all or a portion of its length. In another embodiment, a reflective surface or device may be provided on the strap 200 to enhance the visibility of the strap 200 at night.

According to an embodiment of the invention, an attachment device 300 provides a secure mounting location for coupling to a subject. The attachment device 300, such as a loop formed into a circular structure or a D-ring structure, is mounted to the strap 200 so as to be located near the front of the torso of the operator 20.

An embodiment of the invention allows for relocation of the attachment device 300. The attachment device 300 is formed of a material, such as a metal or plastic, to enable the attachment device 300 to withstand forces applied during use of the leash 50 with a subject. The attachment device 300 may be mounted to the strap 200 as shown in FIGS. 1A and 1B, or may be mounted between the two portions of a strap along the path of the straps as shown in FIG. 2.

Figure 2:
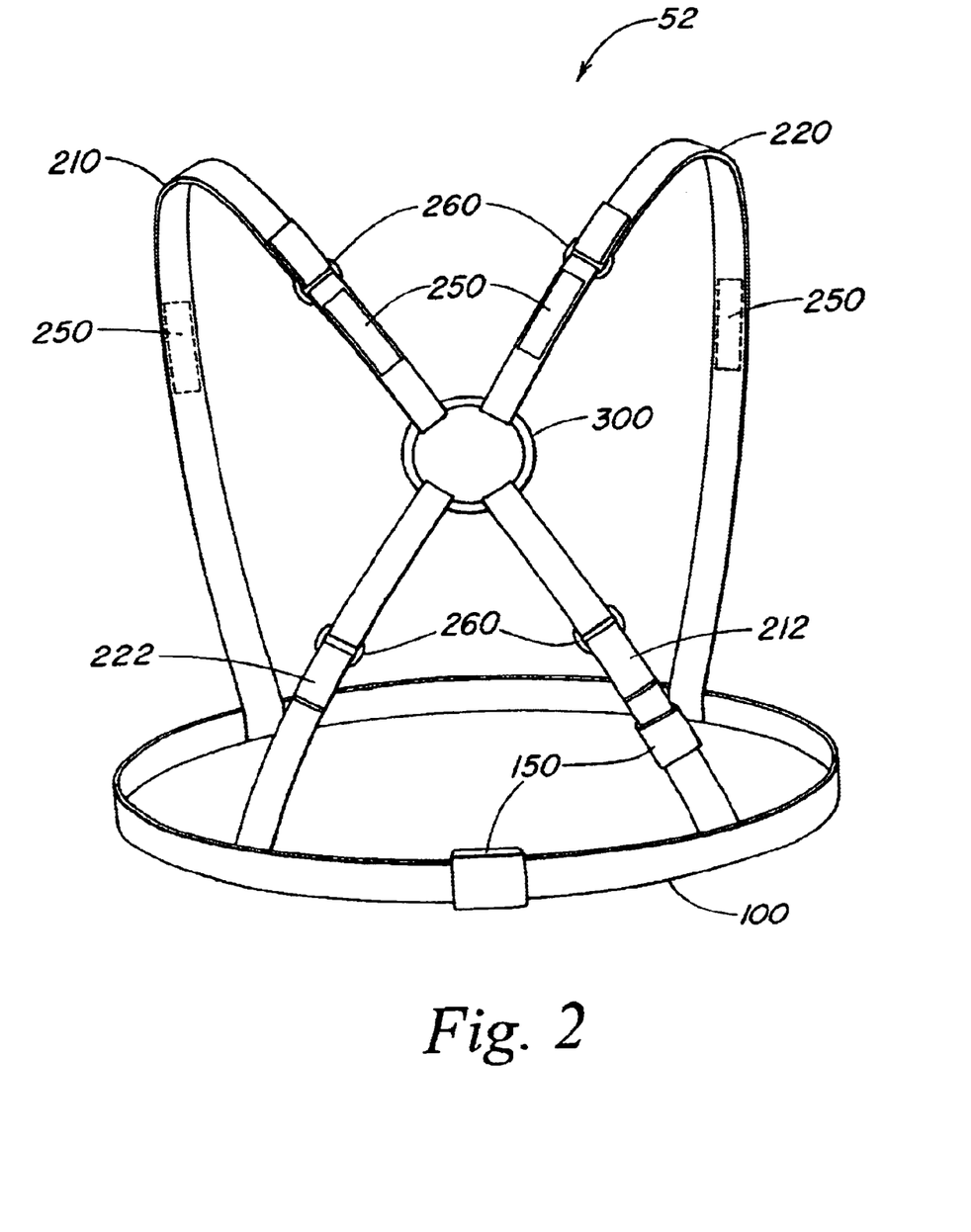
FIG. 2 illustrates a leash according to a further embodiment of the invention.

As illustrated in FIG. 2, a leash 52 according to a further embodiment of the invention is provided having a first upper strap 210 and a second upper strap 220. As shown by way of example, an attachment device 300 is provided in a location along the front of a torso of an operator. The attachment device 300 is formed so as to allow the first upper strap 210 to be coupled to the attachment device 300 and the second upper strap 220 to be coupled to the attachment device 300. A first lower strap 222 and a second lower strap 212 are provided to couple the attachment device 300 relative to a front portion of the belt 100. A buckle 150 is optionally provided as described in relation to the leash 50 of FIGS. 1A and 1B.

According to one embodiment, any straps of the invention, such as the upper straps 210, 220 and lower straps 222, 212 may optionally be provided with reflectors 250 to assist in ensuring the leash 52 is visible to others at night.

According to a further embodiment, any straps of the invention, such as the upper and lower straps 210, 220, 212, 222 may optionally be provided with length adjusters 260 to aid in configuring the leash 52 to the size of the operator. The length adjusters 260 may be a strap lock, a VELCRO® (a registered trademark of Velcro Industries) fastener or any other device providing a length-adjustment capability.

According to an alternative embodiment of the invention, one or more of the straps 210, 212, 220, 222 may be provided with a buckle 150 or other similar device to enable the strap to be separated, thereby aiding in putting the leash 52 on or taking the leash 52 off the operator.

Figure 3:
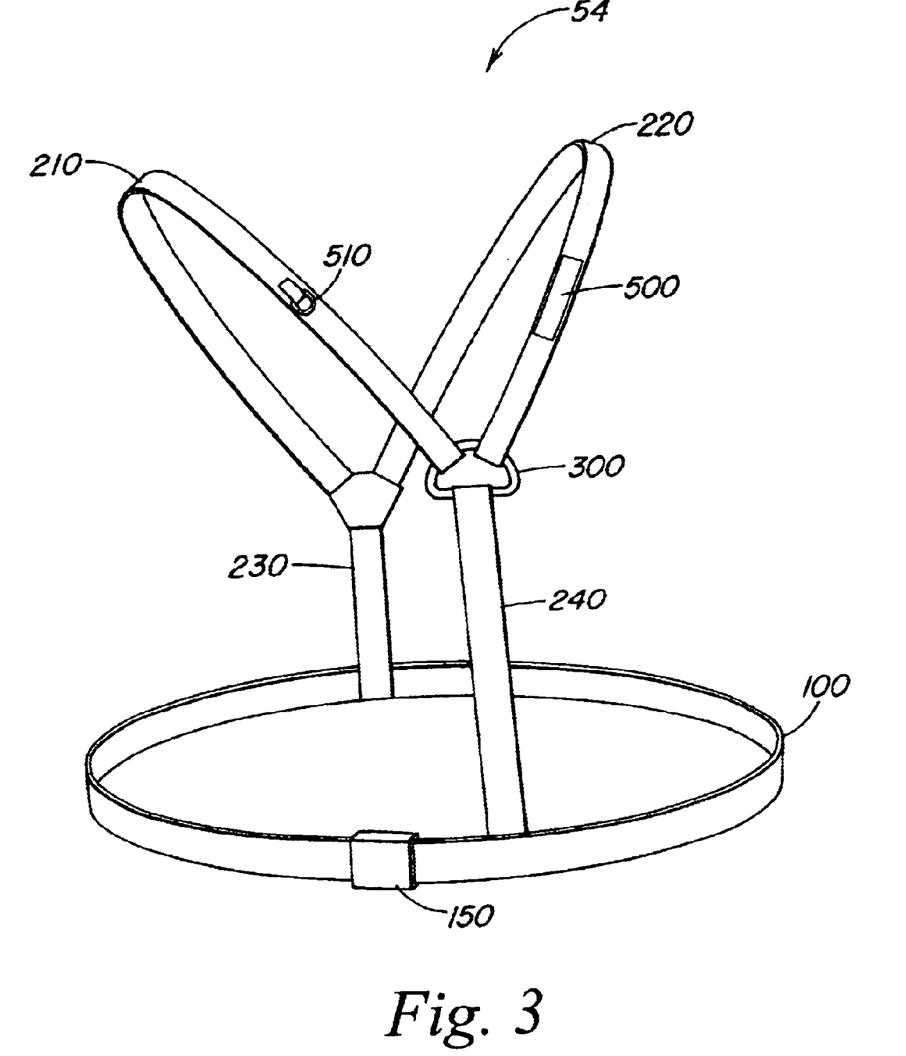
FIG. 3 illustrates a further embodiment of a leash according to the invention.

Alternative embodiments of the present invention involving variations of the number and configuration of the straps 200 are also within the scope of the invention. As shown in FIG. 3, a leash 54 is provided having a first and second upper strap 210, 220 similar to the upper straps of the leash 52 illustrated in FIG. 2. However, a rear connection strap 230 and a front connection strap 240 may be provided alone or in combination to enable the coupling of the first upper strap 210 and/or second upper strap 220 to the belt 100. In the present embodiment, an attachment device 300 is illustrated as having a D-ring shape to better configure the attachment device 300 for mating with the straps 210, 220, 240.

Figure 4:
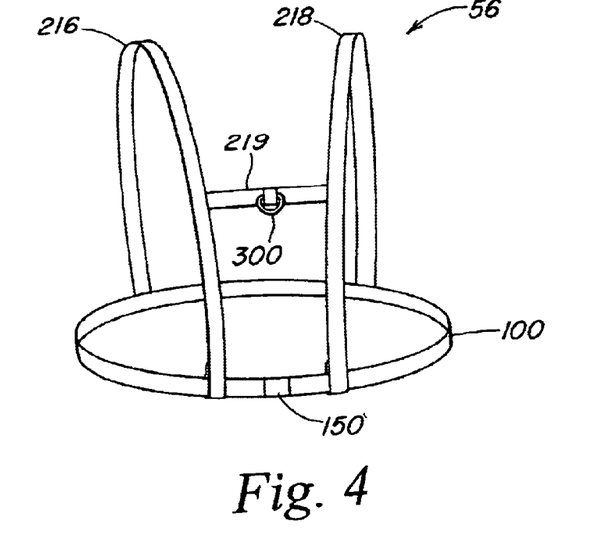
FIG. 4 illustrates an additional embodiment of a leash according to the invention.

According to another embodiment of the invention, shown by way of example in FIG. 4, a leash 56 is provided with a variation of the attachment device 300 location. A first strap 216 and second strap 218 are coupled to a belt 100. A third strap 219 is coupled between the first strap 216 and second strap 218 so as to be located along a front portion of the torso of the operator. An attachment device 300 is mounted to the third strap.

The straps, according to the various embodiments of the present invention, may be securely fastened to the belt 100. For example, stitching or braiding of the straps may be performed to couple the straps to the belt 100. According to an alternative embodiment of the present invention as shown by way of example in FIG. 4, the straps may be formed with a loop at one or both ends of the strap. The belt is slidably mounted within the loop to couple the strap to the belt so as to allow the strap to travel along the belt 100, thereby increasing the adjustability of the coupling location of the straps to the belt 100.

Figure 5A:
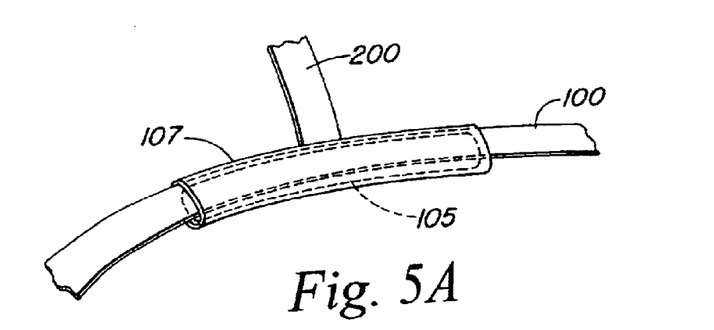
FIGS. 5A and 5B illustrate an example of a gel pack according to an embodiment of the invention.
Figure 5B:
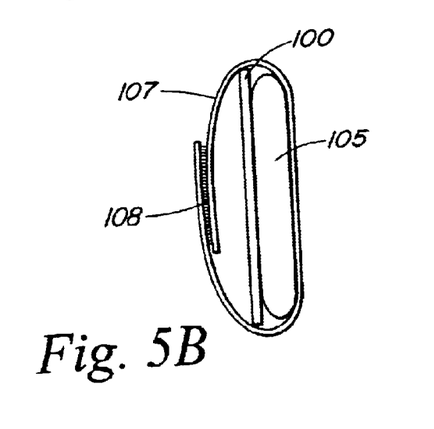

FIGS. 5A and 5B illustrate an example of a gel pack 105 for use in padding a portion of belt 100 in contact with the torso. The gel pack 105 may be slidably located with respect to the belt 100 or may be fixedly secured to a portion of the belt 100. A gel pack housing 107 is provided with a hook and loop fastener 108, such as a VELCRO® (a registered trademark of Velcro Industries) fastener, to secure the gel pack housing 107 about the belt 100. Alternatively, snaps may be used in place of the hook and loop fastener 108, or the gel pack housing 107 may be formed without an ability to open the gel pack housing 107. In such a case, the belt 100 could be thread through the gel pack housing 107, or the gel pack housing 107 could be assembled with the belt 100 located therein. Optionally, a strap 200 may be coupled to the gel pack housing 107, either by the use of a loop formed in the strap 200 or by securely fastening the strap 200 to the gel pack housing 107, such as, for example, by stitching or braiding.

Figure 6A:
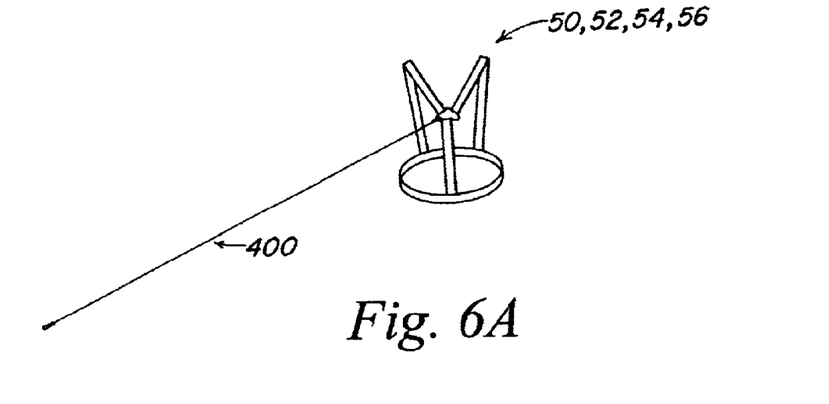
FIG. 6A illustrates a leash coupled to an extension leash according to an embodiment of the invention.
Figure 6B:
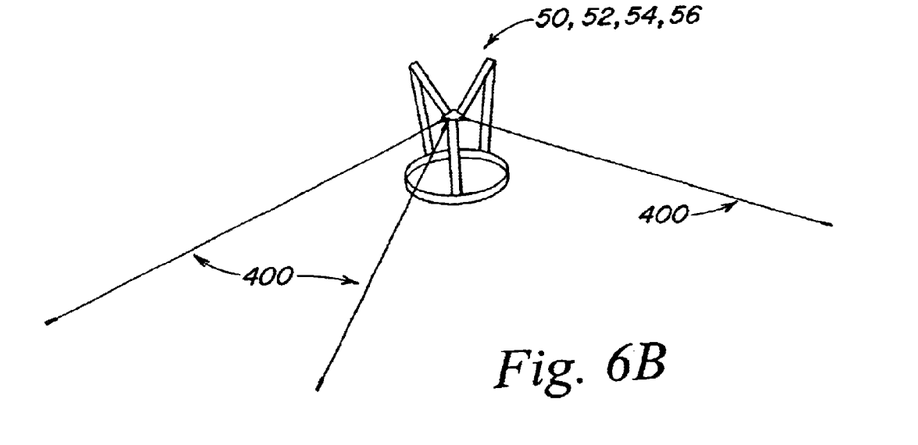
FIG. 6B illustrates a leash coupled to multiple extension leashes according to an embodiment of the invention.
Figure 6C:
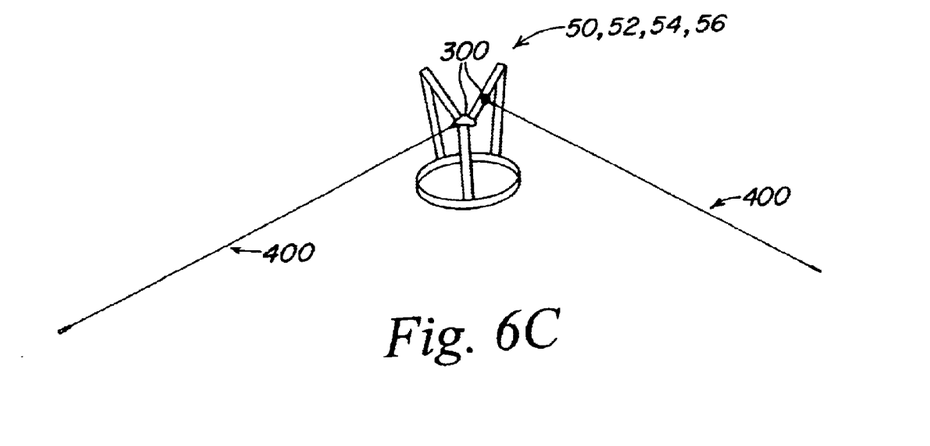
FIG. 6C illustrates a leash coupled to multiple extension leashes and having multiple attachment devices according to an embodiment of the invention.

As shown in FIG. 6A, an embodiment of the invention involves an extension leash 400 coupled to a leash 50, 52, 54, 56 of the present invention. The extension leash 400 may be formed of materials such as those discussed above in relation to the straps or belt. The extension leash 400 is configured to couple to a subject, such as by way of a collar on the subject or by way of a leash 50, 52, 54, 56 mounted to the subject. As shown in FIG. 6B, the leash 50, 52, 54, 56 may be used with a plurality of extension leashes 400. According to another embodiment of the invention, the leash 50, 52, 54, 56 may be provided with a plurality of attachment devices 300. As shown by way of example in FIG. 6C, one or more of the attachment devices 300 may be provided on a strap of the leash 50, 52, 54, 56. The plurality of attachment devices 300 may be used with a plurality of extension leashes 400, including multiple extension leashes 400 with each of the attachment devices 300.

Figure 7:
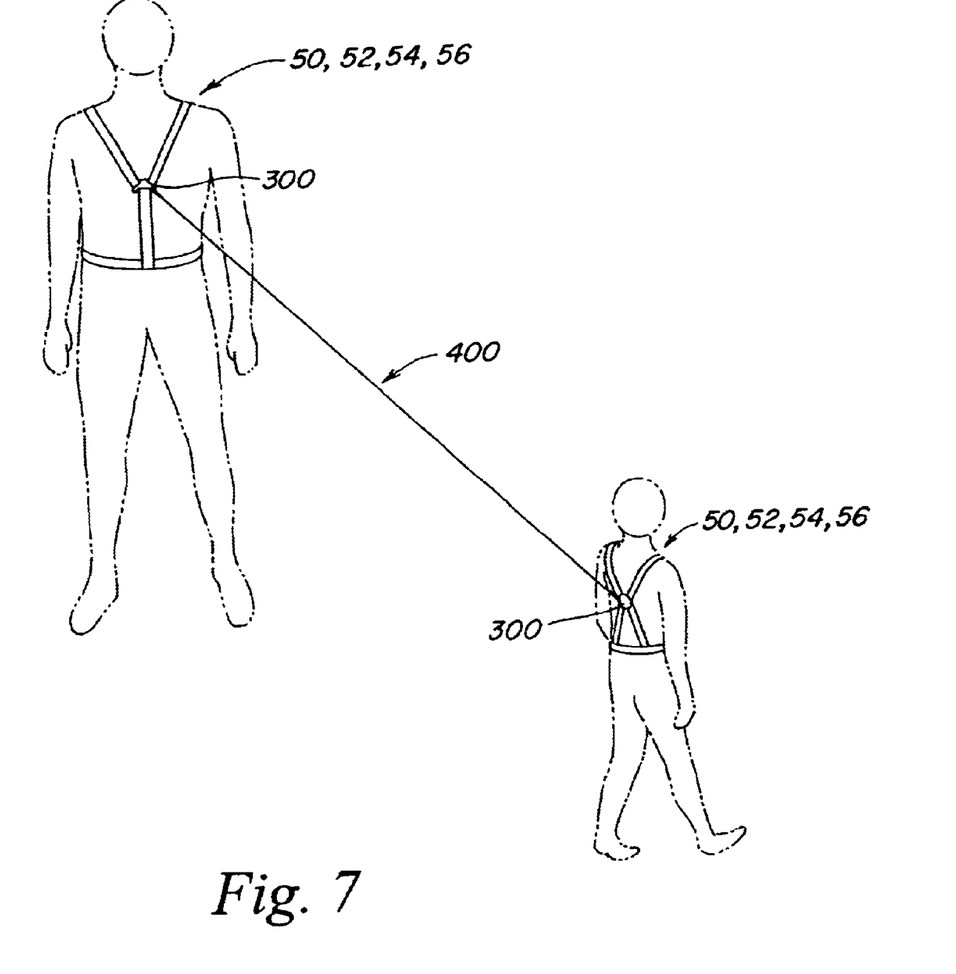
FIG. 7 illustrates two leashes worn by two humans and coupled by an extension leash according to an embodiment of the invention.

In an alternative configuration, one or more human subjects may also be provided with a leash 50. In such a case, the attachment device 300 of the leash worn by the human subject may be located along the rear of the torso of the human subject, as shown in FIG. 7.

Figure 8:
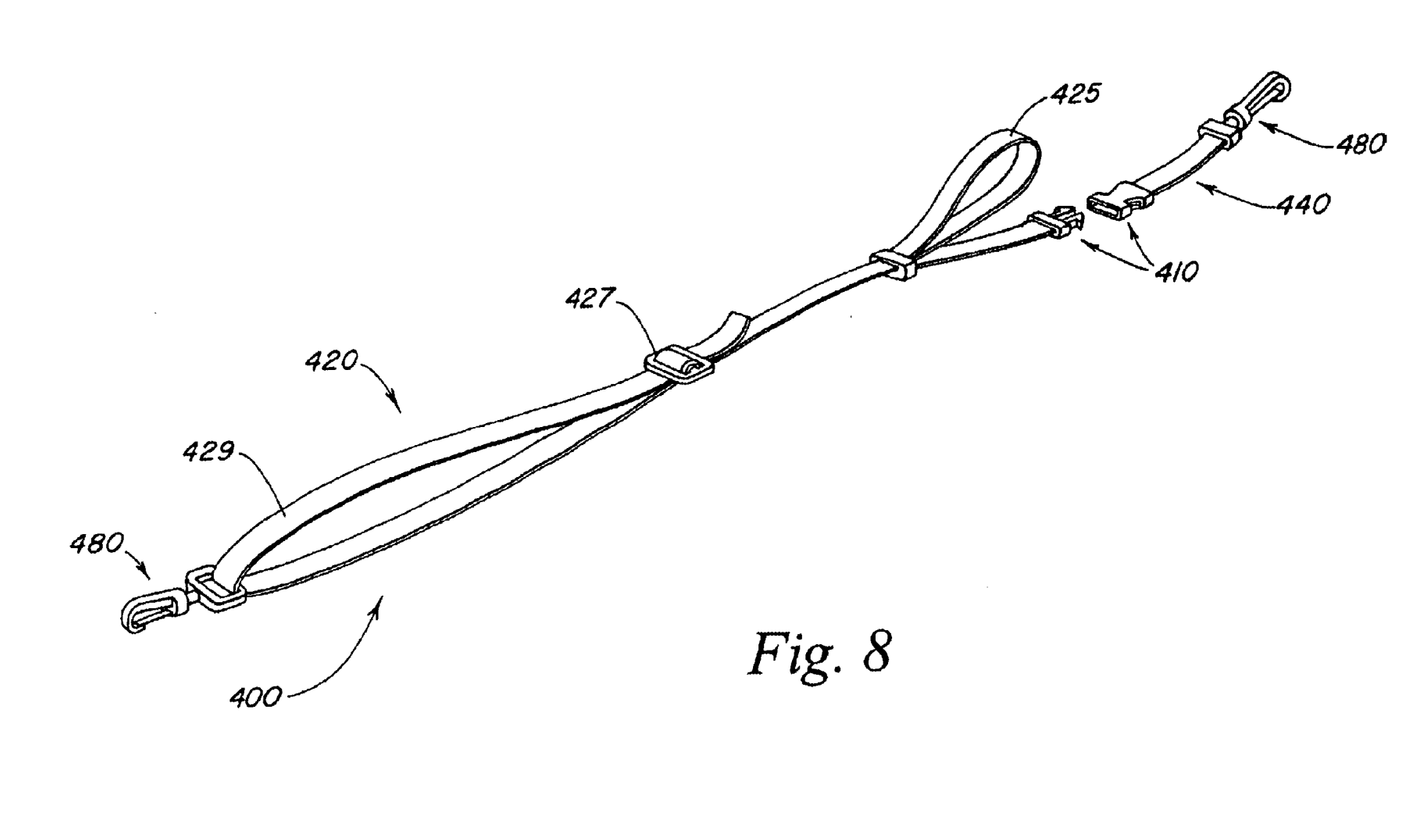
FIG. 8 illustrates an extension leash according to an embodiment of the invention.

As illustrated by way of example in FIG. 8, the extension leash 400 is provided with an attachment device 480, such as a loop or a snap hook, on each end of extension leash. The extension leash 400 may optionally be provided with a first portion 420 and a second portion 440. As shown in FIG. 8, a first portion 420 and second portion 440 may be configured so as to be releasable at a location proximate to the leash 50, 52, 54, 56 by the use of a coupling device 410, such as a buckle. The first portion 420 may be provided with a handle 425 so as to enable manual operation of the first portion 420 when separated from the second portion 440. The handle 425 may be formed by a flexible loop or by use of a rigid material, such as plastic, wood or metal mounted to the first portion 420. Optionally, the first portion 420 may be provided with a variable length as illustrated in FIG. 8. The length of the first portion 420 may be adjusted by movement of the buckle 427 along the length of the first portion 420, thereby adjusting the size of the loop 429. As the buckle 427 travels away from the handle 425, the length of the first portion 420 is increased by reducing the size of the loop 429. The buckle 427 may be any type of buckle, such as a slip, clasp or side-squeeze-type of buckle.

The extension leash 400 may be configured according to an alternative embodiment of the invention so as to automatically separate a first portion 420 from a second portion 440 upon a tensile force exceeding a predetermined amount. Such a configuration could provide for additional safety by preventing the operator from being pulled by very high tensile forces. Such a separation feature may be provided at any point along the length of the extension leash 400.

According to a further embodiment of the invention, a separation feature may be provided within the attachment device 480 at an end of the extension leash. Therefore, the extension leash 400 could be configured to separate from the subject and remain with the operator after releasing the subject. Alternatively, the extension leash 400 could be configured to separate from the operator and remain with the subject According to an alternative embodiment of the invention, the extension leash 400 may be provided with a portion of its length formed of an elastic material to provide for absorption of shock forces along the length of the extension leash 400. Alternatively, the entire length of the extension leash may be formed of an elastic material.

According to an alternative embodiment of the invention, multiple extension leashes 400 may be coupled to an attachment device 300, thereby allowing multiple subjects to be coupled to a single leash 50, 52, 54, 56.

According to a further alternative embodiment of the invention, a pocket 500 may be provided on a strap so as to secure keys, money, or other small valuables to a strap of the leash of the present invention. According to another embodiment, a cinch strap 510 may be provided to secure a bag or other small item to the leash 50, 52, 54, 56. Such a cinch strap can secure a bag for later use in cleaning up pet droppings. A sample location of the pocket 500 and cinch strap 510 are illustrated in FIG. 3. However, the invention is not so limited and the pocket 500 or cinch strap 510 may be located at any point along a strap or the belt 100 of the present invention.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A leash for coupling an operator to a subject, comprising:
    a belt adapted to extend about a torso of said operator;
    a first strap, coupled to said belt at two locations and adapted to extend over a shoulder of said operator;
    an attachment device, mounted to said first strap, and adapted to couple to said subject;
    a second strap, coupled to said belt at two locations and adapted to extend over a second shoulder of said operator; and
    a pocket mounted to one of said straps.

2. A leash for coupling an operator to a subject, comprising:
    a belt adapted to extend about a torso of said operator;
    a first strap, coupled to said belt at two locations and adapted to extend over a shoulder of said operator;
    an attachment device, mounted to said first strap, and adapted to couple to said subject;
    a second strap, coupled to said belt at two locations and adapted to extend over a second shoulder of said operator; and
    a pocket mounted to said belt.

3. A leash for coupling an operator to a subject, comprising:
    a belt adapted to extend about a torso of said operator;
    a first strap, coupled to said belt at two locations and adapted to extend over a shoulder of said operator;
    an attachment device, mounted to said first strap, and adapted to couple to said subject;
    a second strap, coupled to said belt at two locations and adapted to extend over a second shoulder of said operator; and
    an extension leash removably coupled at a first end to said attachment device and, at a second end, adapted to couple to said subject;
    wherein said extension leash is segmented into a first and second section, said second section including said handle and adapted to be coupled to said subject.

4. A leash for coupling an operator to a subject, comprising:
    a belt adapted to extend about a torso of said operator;
    a first strap, coupled to said belt at two locations and adapted to extend over a shoulder of said operator;
    an attachment device, mounted to said first strap, and adapted to couple to said subject; and
    a second strap, coupled to said belt at two locations and adapted to extend over a second shoulder of said operator;
    wherein said second strap is coupled to said belt via said first strap.

5. A leash for coupling an operator to a subject, comprising:
    a belt adapted to extend about a torso of said operator;
    a first strap, coupled to said belt at two locations and adapted to extend over a shoulder of said operator;
    an attachment device, mounted to said first strap, and adapted to couple to said subject; and
    a second strap, coupled to said belt at two locations and adapted to extend over a second shoulder of said operator;

wherein a first end of said first strap and a first end of said second strap are coupled to said belt by a third strap and a second end of said first strap and a second end of said second strap are coupled to said belt by a fourth strap.

6. The leash of claim 5, wherein said first strap and second strap are one continuous strap.

7. The leash of claim 6, wherein said first and second strap have an adjustable length.

8. The leash of claim 5, further comprising a gel pack mounted to said belt proximate to said fourth strap.

9. The leash of claim 5, wherein said attachment device is mounted between said first strap, said second strap and said third strap.

10. The leash of claim 9, further comprising a buckle mounted along said belt to enable said belt to unbuckled.

11. The leash of claim 9, wherein said buckle is reflective.

12. The leash of claim 9, wherein at least one of said straps has an adjustable length.

13. The leash of claim 9, wherein at least one of said straps is padded.

14. The leash of claim 9, wherein said belt is elastic.

15. The leash of claim 9, wherein said belt is formed of a first color and at least one of the group of said first strap and said second strap is formed of a second color different from said first color.

16. The leash of claim 9, wherein at least one of the group of said first strap and said second strap is provided with a reflective surface.

17. The leash of claim 9, further comprising a cinch strap mounted to one of said straps.

18. The leash of claim 9, further comprising a pocket mounted to one of said straps.

19. The leash of claim 9, further comprising a pocket mounted to said belt.

20. The leash of claim 9, wherein said attachment device is formed of at least one of the group of a color and a material to uniquely identify said attachment device.

21. The leash of claim 9, wherein said attachment device is a D-ring.

22. The leash of claim 9, wherein at least one of said straps is provided with a buckle to enable said at least one of said straps to be unbuckled.

23. The leash of claim 9, further comprising an extension leash removably coupled at a first end to said attachment device and, at a second end, adapted to couple to said subject.

24. The leash of claim 23, wherein extension leash is formed of elastic material along at least a portion of its length.

25. The leash of claim 23, wherein said extension leash further comprises a handle.

26. The leash of claim 23, wherein said extension leash is segmented into a first and second section, said second section including said handle and adapted to be coupled to said subject.

27. The leash of claim 23, wherein said extension leash has an adjustable length.

28. The leash of claim 23, wherein said subject is a dog.

29. The leash of claim 23, wherein said subject is a human.

30. The leash of claim 23, wherein said extension leash is removably coupled by a force-limited coupler, thereby adapted to release said extension leash from said attachment device upon a pre-determined amount of tensile force along said extension leash.

31. The leash of claim 9, further comprising a plurality of extension leashes removably coupled at a first end to said attachment device and, at a second end, adapted to couple a corresponding plurality of said subjects.

32. A leash for coupling an operator to a subject, comprising:
 a belt sized to mount about a torso of said operator;
 a lower strap coupled to said belt near a front of said torso;
 an attachment device secured to said lower strap;
 a first upper strap coupled to said attachment device and adapted to extend over a shoulder of said operator and coupled to said belt; and
 a second upper strap coupled to said attachment device and adapted to extend over a shoulder of said operator and coupled to said belt.

33. A leash for coupling an operator to a subject, comprising:
 a belt adapted to extend about a torso of said operator;
 a first strap, coupled to said belt at two locations and adapted to extend over a first shoulder of said operator;
 a second strap, coupled to said belt at two locations and adapted to extend over a second shoulder of said operator;
 a third strap, extending between said first strap and said second strap along a front of said torso; and
 an attachment device, mounted to said third strap, and adapted to couple to said subject.

34. The leash of claim 33, further comprising an extension leash removably coupled at a first end to said attachment device and, at a second end, adapted to couple to said subject.

* * * * *